(12) United States Patent
Mebus

(10) Patent No.: US 12,060,039 B2
(45) Date of Patent: Aug. 13, 2024

(54) TREAD DEVICE FOR A CRAWLER CRANE

(71) Applicant: Liebherr-Werk Ehingen GmbH, Ehingen/Donau (DE)

(72) Inventor: Marc Mebus, Illertissen (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 785 days.

(21) Appl. No.: 17/178,084

(22) Filed: Feb. 17, 2021

(65) Prior Publication Data

US 2021/0253027 A1 Aug. 19, 2021

(30) Foreign Application Priority Data

Feb. 18, 2020 (DE) ..................... 10 2020 104 245.0

(51) Int. Cl.
| | |
|---|---|
| *B66C 13/00* | (2006.01) |
| *B60R 3/00* | (2006.01) |
| *B62D 55/06* | (2006.01) |
| *B62D 55/084* | (2006.01) |
| *B66C 9/00* | (2006.01) |
| *E02F 9/08* | (2006.01) |

(52) U.S. Cl.
CPC ................ *B60R 3/00* (2013.01); *B66C 13/00* (2013.01); *E02F 9/0833* (2013.01); *B62D 55/06* (2013.01); *B62D 55/084* (2013.01); *B66C 9/00* (2013.01); *B66C 2700/0357* (2013.01)

(58) Field of Classification Search
CPC .. B60R 3/00; B66C 13/00; B66C 9/00; B66C 2700/0357; E02F 9/0833; E02F 9/02; B62D 55/06; B62D 55/084
See application file for complete search history.

(56) References Cited

U.S. PATENT DOCUMENTS

2018/0065691 A1* 3/2018 Dumitru ............ B62D 55/0847

FOREIGN PATENT DOCUMENTS

DE 202017107136 U1 3/2019

* cited by examiner

*Primary Examiner* — James A Shriver, II
*Assistant Examiner* — Nicholas R. Kandas
(74) *Attorney, Agent, or Firm* — McCoy Russell LLP

(57) ABSTRACT

The invention relates to a tread device for walking on a crawler carrier of a work machine having a caterpillar drive, wherein the tread device has a holder that can be installed at the crane, in particular at the crawler carrier, at which at least one tread surface is provided, characterized in that the tread surface lies on the upwardly disposed surface of a crawler chain of the caterpillar drive in the state installed at the work machine and the lower side of the tread surface comprises at least one sliding element to ensure a sliding or rolling relative movement between the crawler chain and the tread surface.

13 Claims, 3 Drawing Sheets

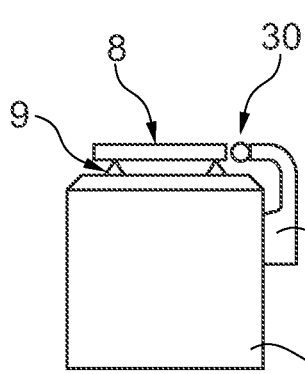
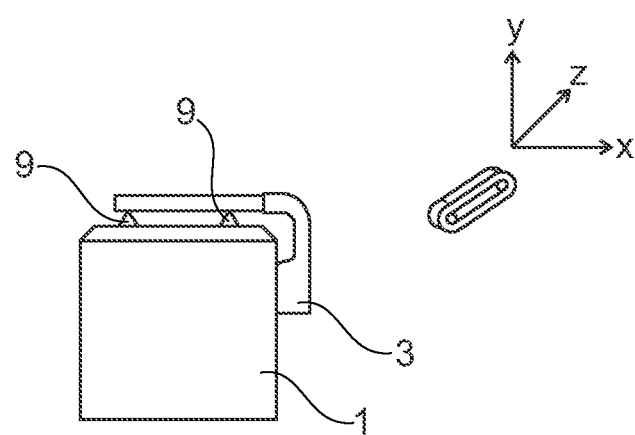
Fig. 3a    Fig. 3b
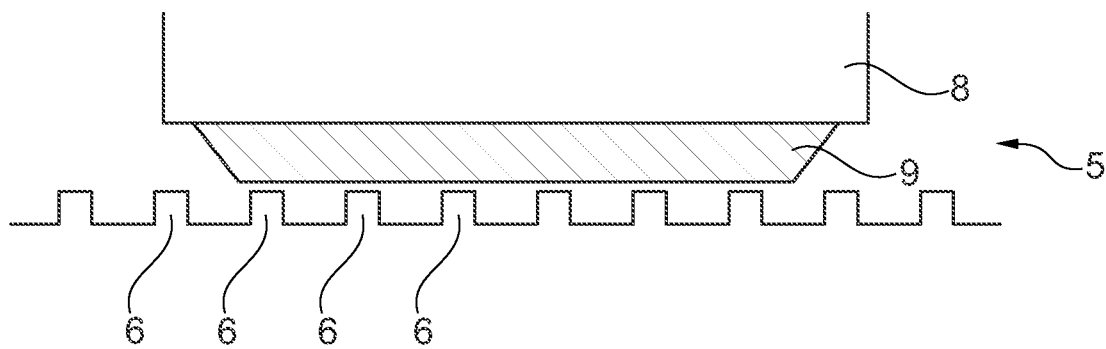
Fig. 3c
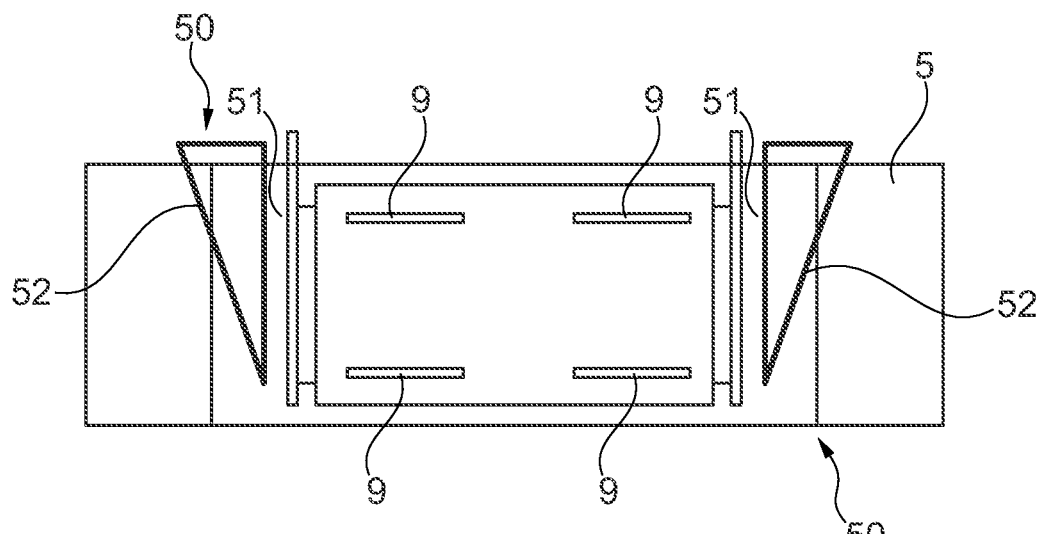
Fig. 4

TREAD DEVICE FOR A CRAWLER CRANE

CROSS REFERENCE TO RELATED APPLICATION

The present application claims priority to German Patent Application No. 10 2020 104 245.0 filed on Feb. 18, 2020. The entire contents of each of the above-listed application is hereby incorporated by reference for all purposes.

TECHNICAL FIELD

The invention relates to a tread device for walking on a crawler carrier of a work machine having a caterpillar drive, wherein the tread device has a holder that can be installed at the crane, in particular at a crawler carrier, at which at least one tread surface is provided.

BACKGROUND AND SUMMARY

Crawler assemblies are used in a plurality of work machines, at crawler cranes for example, and typically comprise at least two crawler carriers arranged laterally at the work machines. When climbing up into the operator's cabin of the work machine, one of the crawler carriers frequently has to be passed over or walked over due to the design of the main access.

Crawler carriers of the category typically comprise a chain that is composed of a plurality of track pads, that lies on carrier rollers at the upper side of the crawler carrier, and that runs on the front side and rear side of the crawler carrier via drive wheels or guide wheels that are arranged there. The upper side of the crawler carriers is accordingly formed by the outer sides (ground contact areas) of the track pads that come into contact with the ground in drive operation. These track pads of the crawler carriers are therefore typically walked over when accessing the operator's cabin. Due to the contact of the outer sides of the track pads with the ground, they are heavily contaminated, which hugely increases the risk of slipping when walking over the crawler carrier and the respective track pads.

It is already known to avoid this problem in the prior art to fasten brackets at the superstructure or undercarriage at which a platform is supported as a walking surface to bridge the crawler chain or track pads. The load the platforms at least have to withstand is normatively regulated and typically results from the weight of the person walking on the platform plus any equipment objects taken along. The platforms and the mounting brackets have to be sufficiently stable to absorb these forces; this in particular applies to the platform that is subjected to an unfavorable lever arm due to the projecting platform plate. This necessity causes a certain structural height which can, however, in particular be problematic in small cranes with a small spacing between the superstructure and the undercarriage.

The object of the present invention therefore deals with the further development of such a tread device for access to a crane operator's cabin via the crawler carrier of the work machine.

This object is achieved by a tread device in accordance with the features of claim 1. Advantageous embodiments of the tread device are the subject of the dependent claims.

It is proposed in accordance with the invention that such a tread device for installation at a work machine, in particular a crawler crane, or at the crawler carrier of the work machine is designed such that the tread surface lies directly on the upwardly disposed surface of a crawler chain of the crawler carrier in the installed state of the tread device. There is accordingly also a material contact between the lower side of the tread surface and the outer side of the track pads of the chain of the crawler carrier in regular operation of the work machine. Against this background, it is further proposed in accordance with the invention to equip the lower side of the tread surface with at least one sliding element to thus ensure a sliding relative movement, that in particular saves material, between the crawler chain and the lower side of the tread surface. A roller support would also be possible.

The walkable bearing surface for the operator via which the person gains access to the crane cabin via the crawler carrier and can thus bridge the contaminated crawler chain is understood as the tread surface. It is conceivable that the tread surface is a component of the holder itself, i.e. the holder and the tread surface are one component. The variant is, however, preferred in which the tread surface is formed by a separate component that is supported at the holder. The additional support of the tread surface on the upper side of the crawler chain in conjunction with the used at least one sliding element has the advantage that an introduction of force from the walkable tread surface can take place directly into the crawler chain, i.e. the at least one sliding element conducts the normal forces acting on the walkable tread surface into the crawler chain.

The holder only experiences a reduced normal force due to the possible force introduction into the crawler chain since it does not have to bear any projecting tread surface or only a reduced projecting tread surface. The holder can accordingly be dimensioned as considerably smaller or more filigree than in the prior art. A very low structure of the total tread device is thereby made possible that withstands the normatively regulated loads and can thus also in particular be used with work machines or cranes of small dimensions.

The at least one sliding element can, in accordance with a preferred embodiment, be designed as a sliding rail extending in the direction of travel. A dimensioning of the length of the sliding element or sliding rail is advantageous such that it extends, viewed in the assembled position and in the direction of travel of the work machine, continuously over a plurality of consecutive track pads of the crawler chain. A better and distributed force introduction into a plurality of track pads of the crawler chain is hereby ensured. A better sliding support can thus be achieved.

The tread surface can be designed with a slip-resistant surface. The slip-resistant effect can be achieved by a suitable coating of the surface of the tread surface or by a suitable material selection of the tread surface itself.

A plurality of options are conceivable for the design with a plurality of sliding elements and their arrangement on the lower side of the tread surface. An embodiment is conceivable having at least two sliding elements or sliding rails arranged in parallel with one another viewed in the direction of travel of the work machine. It is equally conceivable to arrange a plurality of separate sliding elements or sliding rails behind one another viewed in the direction of travel. Depending on the application case and on the design of the tread surface, a better force introduction into the crawler chain can be effected by the specific arrangement and embodiment of the sliding elements.

The track pads in the crawler chain move caused by contaminants, asynchronism, vertical tolerances, webs, or similar. The corresponding movements of this track pad are uniformly transferred into the sliding elements and can result in component damage. For this reason, the tread surface is ideally movably supported by at least one degrees of freedom at the holder, whereby any movements of the crawler chain are compensated by the co-movement of the tread surface.

A relative movement between the tread surface and the holder can be implemented by means of pivot bearings. The installation of the tread surface at the holder by means of elongate holes and corresponding counter-connection means is possibly simpler to enable a certain relative movement.

When making use of a pivot holder, there is still the possibility of being able to pivot the tread surface away as required. The tread surface could thereby in particular, for example, be pivoted out of a rotation zone of the superstructure of the work machine. The design of the pivot bearing can be with a horizontal pivot axis, whereby the tread surface can be flipped up, for example, when not in use.

In accordance with an advantageous embodiment, the at least one sliding element or the sliding rail consists of or comprises a softer material than the track pads of the crawler chain. A certain elasticity of the sliding element is also conceivable to thereby be able to compensate smaller movements of the crawler chain. The embodiment as a wear element that has to be replaced as required or at intervals is sensible. Plastic, preferably a thermoplastic, ideally of high strength, can be named as a suitable material for the sliding elements/sliding rail. Polyamides, particularly preferably PA6G are particularly suitable.

In accordance with an advantageous embodiment of the invention, contamination of the crawler chain or of the individual track pads can be reduced by the arrangement of at least one scraping means at the holder and/or tread surface. The arrangement and alignment of the scraping means is such that, on a chain movement relative to the tread device, contaminants are scraped off the outer side of the upwardly disposed chain elements/track pads. For this purpose, the scraping means comprises at least one scraper edge that slides over the outer side of the track elements, that scrapes off contaminants, and preferably removes them to the outside. The arrangement of the scraper edge can take place by means of a carrier means at the holder and/or at the tread surface. The design of the tread device with a scraper edge disposed in front of the tread device in the direction of travel and/or disposed downstream is conceivable.

The scraper edge is ideally not oriented perpendicular to the direction of travel to remove the scraped off contaminant particles to the outside, but is rather instead aligned at a certain oblique angle with respect to the direction of travel. Contaminant particles are conveyed outwardly or inwardly in the direction of the superstructure in dependence on the angular direction. The removal is preferably outward.

The scraper edge can moreover be designed with a snowplow-like arching extending in the vertical direction to optimize the removal of the dirt particles. A dirt-repeller, in particular in the form of a shield mounted at the surface, can be installed at the upper side of the scraper edge to protect the trailing tread device from scraped off contaminants.

In addition to the tread device in accordance with the invention, the present invention equally relates to a work machine or a crawler crane having a crawler assembly and at least one tread device in accordance with the invention arranged at the work machine or at the crawler carrier. The same advantages and properties consequently result for the work machine such as have already been resented in detail above with reference to the tread device in accordance with the invention. A repeat description is dispensed with for this reason.

In an advantageous embodiment, provision can be made for the crawler crane that the holder of the tread device is installed at the inner side, or alternatively at the outer side, of the crawler carrier. The installation at the outer side of the crawler carrier has the advantage that the tread surface can be flipped out of the pivot zone of the superstructure by a suitable pivot bearing of the tread surface at the holder. The required spacing between the superstructure and the undercarriage for the accommodation of the tread surface can thereby again be considerably reduced. Such a solution would be conceivable at only one crawler carrier or at both crawler carriers.

The crawler crane preferably comprises extendable crawler carriers for flexible changes of the track width of the crawler crane. On the embodiment of the tread device in accordance with the invention and its installation on the crawler carrier, it can be displaced together with the crawler carrier.

BRIEF DESCRIPTION OF THE FIGURES

Further advantages and properties of the invention will be explained in more detail in the following with reference to an embodiment shown in the Figures. There are shown:

FIGS. 1a-1d: different representations of the tread device in accordance with the invention in accordance with a first embodiment variant;

FIG. 2: an alternative arrangement of the tread device in accordance with the first embodiment variant of FIG. 1;

FIGS. 3a-3c: representations of a modified embodiment of the tread device in accordance with the invention;

FIG. 4: a further embodiment of a modified tread device;

DETAILED DESCRIPTION

Figure 5:
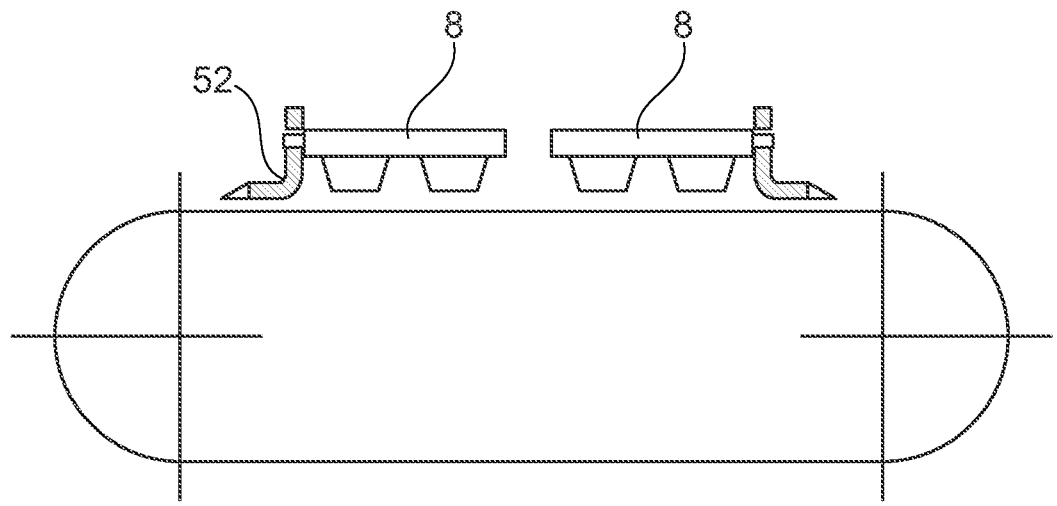
FIG. 5: a further modification of the tread device in accordance with the invention.

The basic idea of the tread device in accordance with the invention for walking on a crawler chain of a work machine or of a crawler crane should first be explained with reference to a first embodiment variant, shown in FIGS. 1a to 1d. The innovative tread device shown consists of a comparatively small holder that is laterally installed at the crawler carrier 1 of a crawler crane. In the variant of FIGS. 1a to 1d, it is fastened at the inner side of a crawler carrier between the undercarriage and the crawler carrier.

Figures 1A, 1B, 1C, 1D, 2:
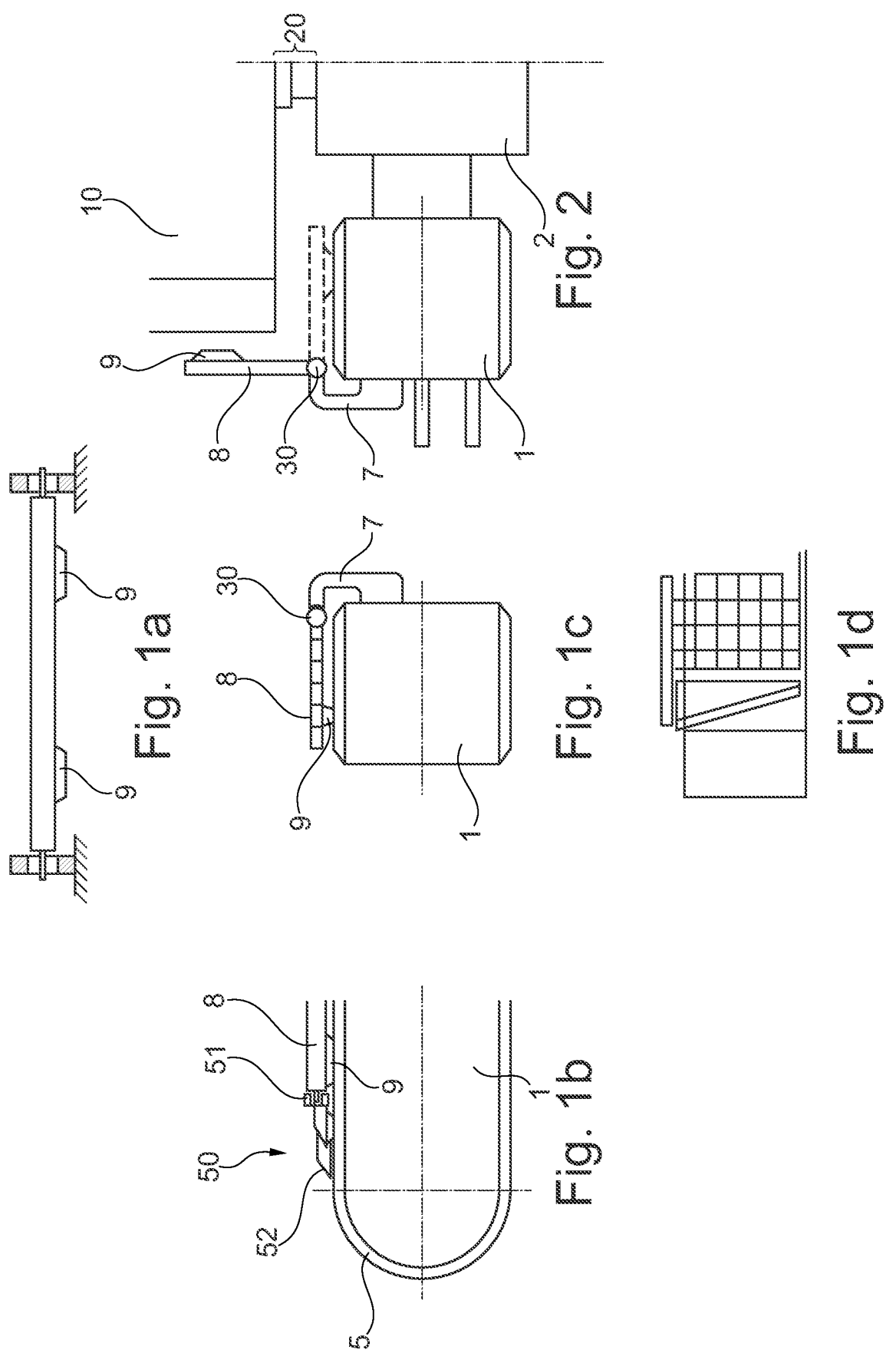

The direction of travel runs from left to right in FIGS. 1a and 1b. The walkable surface 8 at the holder 7 is attached via the crawler chains 5. The walkable surface 8 can be slip-resistant at its upper surface and can have a carrier plate. So that the holder 7 can be designed as very low in comparison with the known platforms, at least one sliding element 9 is provided below the walkable surface 8. The sliding element 9 supports the walkable surface 8 and takes up the normal forces introduced into the walkable surface 8 that are then transmitted into the crawler chain 5 by the sliding element 9. In general, the sliding elements 9 can be produced from a softer material than the track pads 6. A plastic such as PA6G is, for example, suitable.

The sliding element 9 is relatively long so that it lies on a large number of track pads 6 serially contiguous and can support the walkable surface 8. The holder 7 therefore substantially likewise only experiences a normal force since, unlike the solutions from the prior art, it does not have to bear any projecting platform. This permits a filigree design of the holder 7. The holder 7 is, however, also loaded in the Z direction in addition to the normal force (FIG. 3b). This results from the movement of the crawler chain 5 with respect to the sliding elements 9 and a possible drive device 50 that will be explained below.

In the embodiment of FIGS. 1a-1d, the tread device in accordance with the invention comprises two sliding elements 9 that are arranged next to one another and in parallel with one another in the direction of travel. In accordance with FIG. 1c, an embodiment is also possible with only one sliding element or with a plurality of sliding elements. The sliding element 9 here conducts the normal force into the crawler-type vehicle. The pivot connection 30 takes up the torque occurring around the sliding bearing 9. It has to have larger dimensions in the solution in accordance with FIG. 1c than in the solution in accordance with FIG. 3b.

The walkable surface 8 is movably supported at the holder 7 with at least one degree of freedom, which is implemented in the embodiment of FIGS. 1a-1d by a corresponding pivot connection 30 having a horizontal pivot axis. Additionally or alternatively, elongate holes and corresponding counter-connection means are conceivable. The movability of the sliding elements 9 and of the movable surface 8 with respect to the holders 7 is of prime importance. The track pads 6 in the crawler chain 5 move caused by contaminants, asynchronism, vertical tolerances, webs, or similar and the sliding elements 9 must be able to follow these movements without destroying any component.

To keep the addressed problem small, at least one scraping element 50 is therefore additionally provided that is supported at the tread device or at the movable surface 8 by means of a carrier 51. The carrier 51 has at least one degree of freedom about which the carrier is movable with respect to the walkable surface 8 or the holder 7 so that corresponding movements of the crawler chain can also be compensated here. A scraper edge 52 is furthermore provided at the carrier 51 to be able to scrape off the contaminants from the contact surface of the track pads of the crawler chain. The oblique position of the scraper edge 51 shown in FIGS. 1d and 4 has the result that dirt and larger stones are scraped off the track pads 6 of the crawler carrier 1 and are simultaneously conveyed outwardly from the crawler carrier 1.

Whereas the holder 7 is fastened to the inner side of the crawler carrier 1 in the embodiment of FIGS. 1a-1d, it is instead installed at the outer side of the crawler carrier 1 in the embodiment in accordance with FIG. 2. The tread surface 8 can thus be pivoted upwardly by the pivot joint 30 to thereby not block the pivot zone of the superstructure 10 about the slewing ring at the undercarriage. A use of the tread device even on cranes having an even smaller spacing 20 between the undercarriage and the superstructure can thereby take place.

In general, the solution of the tread device in accordance with the invention is conceivable at only one single crawler carrier 1 or at both crawler carriers 2 of the crawler crane. The total device requires very little construction space and can thus as a rule also remain at the apparatus in the transport state or with a set wide track of the crawler assembly and does not have to be dismantled. The crawler crane considered here can have extendable crawler carriers 1. The system of the tread device is then displaced together with the crawler carrier.

While the embodiment of FIGS. 1a-1d and 2 only shows a single sliding element 9, in the modification of FIGS. 3a-3c, the lower side of the tread surface 8 can also be designed with two sliding elements 9 arranged in parallel with one another viewed in the direction of travel. The individual lengths of the separate sliding elements 9 are here selected such that they extend over a plurality of track pads 6 in the direction of travel (see FIG. 3c).

In the embodiment of FIG. 4, not only sliding elements 9 arranged in parallel are provided, but also a plurality of sliding elements 9 arranged behind one another in the direction of travel are used. In addition in this process, a respective scraping element 50 is provided both at the front side and at the rear side of the tread device.

FIG. 5 again shows a modification of the tread device that comprises a plurality of separate tread surfaces 8 that are arranged behind one another in the direction of travel. Each tread surface is here designed with a plurality of sliding elements 9. In addition, the embodiment with two tread surfaces 8 comprises a plurality of scraping elements 50, with a first scraping element 50 being provided at the front tread surface 8 and a further scraping element 50 being provided at the rear side of the second tread surface 8.

The embodiment of the scraping elements 50 or of the scraper edges 52 is similar to that of a snowplow. The corresponding blade 52 could be adjustable and the spacing from the crawler chain could thus be variable and it thereby scrapes off any contaminants from the surface of the track pads 6. A corresponding arching of the scraper edge 52 provides a better removal of the contaminants. In addition, the blade 52 or the scraper edge 52 can extend obliquely to the rear to the left or right to remove the scraped off contaminants to the right or left.

Figure 6:
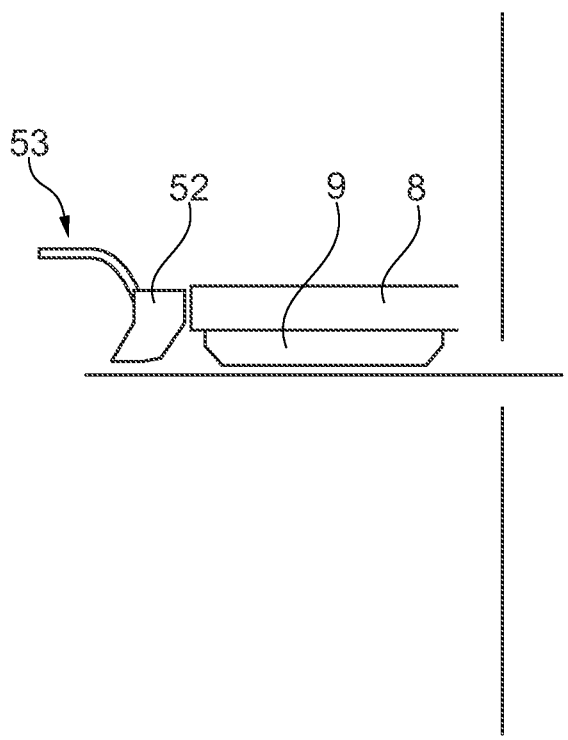
FIG. 6: an embodiment variant of the scraping device of the tread device in accordance with the invention.

As can be seen from FIG. 6, the scraper edge 62 can additionally be designed with a dirt repeller 53 arranged at its upper side to protect the tread surface 8 disposed behind it from the scraped off contaminants.

The invention claimed is:

1. A tread device for walking on a crawler carrier of a work machine having a caterpillar drive, wherein the tread device has a holder that can be installed at the crane, in particular at the crawler carrier, at which at least one tread surface is provided,
   wherein
   the tread surface lies on the upwardly disposed surface of a crawler chain of the caterpillar drive in the state installed at the work machine and the lower side of the tread surface comprises at least one sliding element or roller element to ensure a sliding or rolling relative movement between the crawler chain and the tread surface, wherein there is a material contact between the lower side of the tread surface and an outer side of track pads of the crawler chain.

2. A tread device in accordance with claim 1, wherein the sliding element is configured as a siding rail extending in the direction of travel of the work machine and the length of the at least one siding element in the direction of travel of the work machine is selected such that the sliding element extends continuously over a plurality of track pads of the crawler chain.

3. A tread device of claim 1, wherein the tread surface is formed by a surface section of the holder or by an element, in particular a carrier plate, supported at the holder.

4. A tread device of claim 1, wherein the surface of the tread surface is slip-resistant.

5. A tread surface of claim 1, wherein at least two sliding elements are provided that are arranged in parallel with one another viewed in the direction of travel, and wherein a plurality of individual sliding elements are arranged behind one another on the lower side of the tread surface viewed in the direction of travel.

6. A tread device of claim 1, wherein the tread surface is movably connected to the holder in an articulated manner thereto by at least one degree of freedom, the tread surface preferably being able to be pivotably connected to the holder in an articulated manner, in particular such that the tread surface can be flipped upward about a horizontal axis.

7. A tread device of claim 1, wherein the at least one sliding element comprises a softer material than the track pads of a crawler assembly, in particular plastic, preferably PA6G.

8. A tread device of claim 1, wherein at least one scraping means is provided at the holder or at the tread surface to scrape off contaminants from the surface of the chain in the installation position at the crawler carrier.

9. A tread device of claim 8, wherein the scraping means comprises a carrier that is movably arranged at the holder or at the tread surface and comprises at least one scraper edge arranged transversely or obliquely to the direction of running in the installation position, where scraped off contaminants are conveyed in the direction of the outer side by an oblique alignment of the scraper edge.

10. A tread device of claim 9, wherein the scraper edge is arched; and wherein that a repeller is installed at the upper side of the scraper edge.

11. A crawler crane having a crawler assembly and at least one tread device in accordance with claim 1 arranged at the crane or at the crawler assembly.

12. A crawler crane in accordance with claim 11, wherein the holder of at least one tread device is installed at the inner side or outer side of a crawler carrier.

13. A crawler crane of claim 12, wherein the crane has extendable crawler carriers and the tread device is displaceable together with the crawler carrier.

* * * * *